United States Patent
Takamura

(10) Patent No.: US 9,008,461 B2
(45) Date of Patent: Apr. 14, 2015

(54) IMAGE PROCESSING APPARATUS AND IMAGE PROCESSING METHOD

(71) Applicant: Canon Kabushiki Kaisha, Tokyo (JP)

(72) Inventor: Akihiro Takamura, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 13/905,626

(22) Filed: May 30, 2013

(65) Prior Publication Data

US 2013/0330018 A1   Dec. 12, 2013

(30) Foreign Application Priority Data

Jun. 6, 2012 (JP) ................. 2012-129160

(51) Int. Cl.
*G06K 9/32* (2006.01)
*G06T 3/40* (2006.01)
*G06T 3/00* (2006.01)

(52) U.S. Cl.
CPC .... *G06T 3/40* (2013.01); *G06T 3/00* (2013.01)

(58) Field of Classification Search
USPC ......................................... 382/276, 293, 298
See application file for complete search history.

(56) References Cited

U.S. PATENT DOCUMENTS

| | | | | |
|---|---|---|---|---|
| 7,710,434 | B2* | 5/2010 | Gu | 345/589 |
| 8,204,331 | B2* | 6/2012 | Fukuhara et al. | 382/260 |
| 2008/0232712 | A1* | 9/2008 | Matsui et al. | 382/277 |
| 2011/0129154 | A1* | 6/2011 | Shimodaira | 382/190 |

FOREIGN PATENT DOCUMENTS

| JP | 6-149993 A | 5/1994 |
|---|---|---|
| JP | 2005-33271 A | 2/2005 |

* cited by examiner

*Primary Examiner* — Phuoc Tran
(74) *Attorney, Agent, or Firm* — Fitzpatrick, Cella, Harper & Scinto

(57) ABSTRACT

An image-processing technique implements image processing including division with high calculation precision using an image processing apparatus for executing image transformation processing for an input image including: a parameter calculation unit configured to calculate a plurality of transformation parameters each represented by a fixed point number having an n-bit length; and a calculation unit configured to perform calculation for coordinate conversion processing in the image transformation processing using the plurality of transformation parameters calculated by the parameter calculation unit.

12 Claims, 3 Drawing Sheets

IMAGE PROCESSING APPARATUS AND IMAGE PROCESSING METHOD

BACKGROUND OF THE INVENTION

1. Field of the Invention

The present invention relates to image processing and, more particularly, to a technique of performing coordinate conversion processing in image transformation with high precision.

2. Description of the Related Art

When a front projection type projector diagonally projects a video toward a projection plane (a screen or the like), a rectangular video is projected as a transformed quadrilateral (a trapezoid or the like). To project a rectangular video as a rectangle, image transformation processing called keystone correction is used (for example, Japanese Patent Laid-Open No. 2005-33271). More specifically, a projective transformation (coordinate conversion) matrix is determined based on the shape (in general, a rectangular shape) of an input image and the shape of a projected image. Coordinates in the input image corresponding to the coordinate values of a given pixel of an output image are calculated by inverse conversion of coordinate conversion. Based on pixel values at the calculated coordinates in the input image, pixel values in the output image are calculated by interpolation calculation. For example, the pixel values of the pixel of the output image are determined by reading out the pixel values of adjacent pixels using the integer parts of the pixel values at the calculated coordinates in the input image, and weighting them based on the fraction parts of the pixel values at the calculated coordinates in the input image. This processing is executed for all the pixels of the output image, thereby storing the obtained values in an output image memory. It is possible to obtain a preferable projection result by projecting such stored output image.

In general, in projective transformation for image transformation, division is necessary besides addition/subtraction and multiplication. More specifically, it is desirable to perform coordinate conversion with high precision to correctly execute the above-described interpolation calculation. Note that to perform calculations including division, like projective transformation with high precision, a calculation with a longer bit length (for example, double precision) is necessary, resulting in an increase in implementation cost. To solve this problem, instead of executing calculation processing with a longer bit length, there is proposed a technique of restricting the transformation range and resolution so as not to increase a calculation error even with a short bit length (for example, single precision). For example, Japanese Patent Laid-Open No. 6-149993 discloses a method of performing coordinate conversion by approximate calculation of addition processing.

Since, however, the image resolution has recently improved (for example, the HD resolution (1920×1080) or 4K resolution (4096×2160)), if the approximate calculation as disclosed in Japanese Patent Laid-Open No. 6-149993 is used, it may be impossible to achieve sufficient precision. If the calculation precision in the above-described coordinate conversion (projective transformation) for image transformation is not sufficient, for example, a pixel loss or the like occurs in an output image, thereby causing a deterioration in the image quality.

SUMMARY OF THE INVENTION

The present invention implements image processing including division with high calculation precision.

According to an aspect of the present invention, an image processing apparatus for executing image transformation processing for an input image, comprises: a parameter calculation unit configured to calculate a plurality of transformation parameters each represented by a fixed point number having an n-bit length; and a calculation unit configured to perform a calculation for coordinate conversion processing in the image transformation processing using the plurality of transformation parameters calculated by the parameter calculation unit. The the parameter calculation unit comprises an initial parameter deriving unit configured to derive a plurality of initial parameters each represented by a fixed point number having an m-bit length (m>n), a scaling coefficient deriving unit configured to derive a scaling coefficient such that a rounding error becomes smallest when converting an initial parameter, among the plurality of initial parameters, which has a largest influence on a calculation error in the coordinate conversion processing, into a fixed point number having an n-bit length, and an adjustment unit configured to calculate, as the plurality of transformation parameters, a plurality of parameters obtained by multiplying each of the plurality of initial parameters by the scaling coefficient derived by the scaling coefficient deriving unit, and converting the obtained values into fixed point numbers each having an n-bit length. The initial parameter which has the largest influence on the calculation error in the coordinate conversion processing is selected from at least one initial parameter, among the plurality of initial parameters, used for a divisor in division processing included in the coordinate conversion processing.

The present invention provides a technique of implementing image processing including division with high calculation precision.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will be described in detail below with reference to the accompanying drawings. Note that the following embodiments are merely examples, and are not intended to limit the scope of the present invention.

First Embodiment

As the first embodiment of an image processing apparatus according to the present invention, an image processing apparatus integrated in a front-projection-type liquid crystal projector will be exemplified below.

<Apparatus Arrangement>

Figure 1:
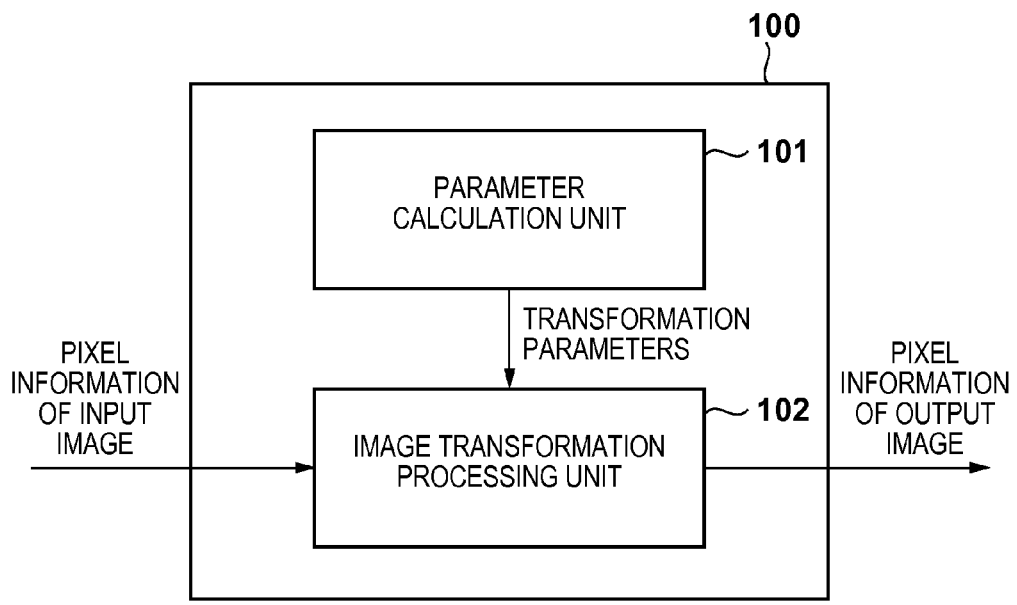
FIG. 1 is a block diagram showing the arrangement of an image processing apparatus according to the first embodiment.
Figure 2:
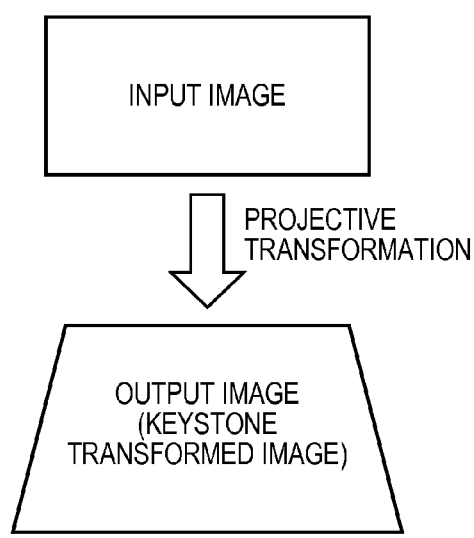
FIG. 2 is a view exemplarily showing the shapes of an input image and output image.

FIG. 1 is a block diagram showing the arrangement of an image processing apparatus 100 according to the first embodiment. The image processing apparatus 100 includes a parameter calculation unit 101 and an image transformation processing unit 102. Assume in the first embodiment that the parameter calculation unit 101 is implemented by software, and the image transformation processing unit 102 for which a processing speed is required is implemented by hardware (for example, a DSP). Furthermore, FIG. 2 is a view exemplarily showing the shape of an input image and that of an output image having undergone keystone transform processing. Note that although a trapezoidal shape is shown in FIG. 2 as the output image having undergone keystone transform processing, the output image may have an arbitrary quadrilateral shape.

The parameter calculation unit 101 calculates transformation parameters for converting the coordinates of each pixel of the input image into those of each pixel of the output image, and outputs the calculated parameters to the image transformation processing unit. For example, high precision transformation parameters (initial parameters) are calculated based on the coordinates of four vertices for determining the shape of the input image and those of four vertices for determining the shape of the output image. Note that the high precision transformation parameters are the elements of a projective transformation matrix, and are calculated with bit precision with which the parameter calculation unit 101 can perform its calculation. Although it is assumed in this example that the parameters are calculated as double precision fixed point numbers each having an m-bit length, the parameters may be calculated as floating point numbers. The parameter calculation unit 101 converts the calculated high precision transformation parameters into transformation parameters with bit precision usable by the image transformation processing unit 102, and then outputs the transformation parameters to the image transformation processing unit 102.

Based on the transformation parameters input by the parameter calculation unit 101, the image transformation processing unit 102 performs calculation of coordinate conversion (that is, projective transformation for image transformation) for the coordinate values of each pixel of the input image, thereby calculating the coordinate values of each pixel of the output image. In this example, assume that the image transformation processing unit 102 calculates the value as a single precision fixed point number having an n-bit length. Furthermore, based on the pixel values of each pixel of the input image and the calculated coordinate values of each pixel of the output image, the image transformation processing unit 102 calculates and outputs the pixel values of each pixel of the output image.

Figure 3:
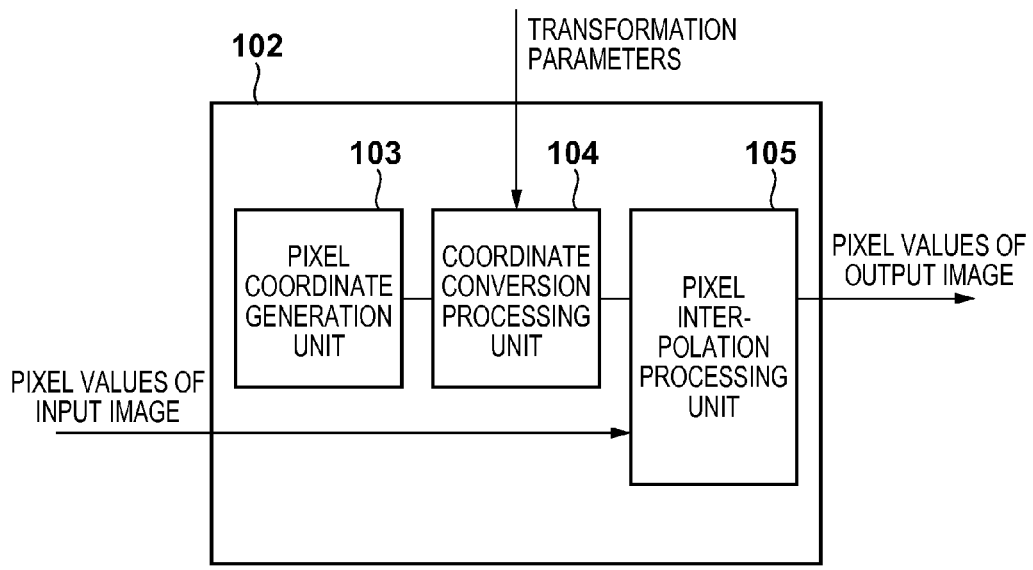
FIG. 3 is a block diagram showing the arrangement of an image transformation processing unit.

FIG. 3 is a block diagram showing the arrangement of the image transformation processing unit 102 according to the first embodiment. The image transformation processing unit 102 includes a pixel coordinate generation unit 103, a coordinate conversion processing unit 104, and a pixel interpolation processing unit 105.

The pixel coordinate generation unit 103 generates the coordinate values (x, y) of each pixel of the input image, and outputs the generated coordinate values (x, y) to the coordinate conversion processing unit 104. If, for example, the input image is an image having the HD resolution (1920×1080), the following coordinate values of each pixel are generated and output:

(x,y)=(0,0),(1,0), . . . ,(1919,0),(0,1),(1,1), . . . ,(1919, 1), . . . (0,1079),(1,1079), . . . ,(1919,1079)

Based on the transformation parameters input by the parameter calculation unit 101, the coordinate conversion processing unit 104 performs projective transformation for the coordinate values (x, y) input by the pixel coordinate generation unit 103, thereby calculating the coordinate values (X, Y) of each pixel of the output image. Note that the image transformation processing unit 102 is configured to process single precision fixed point number values, as described above. That is, the transformation parameters input by the parameter calculation unit 101 are input as single precision fixed point number values. The coordinate conversion processing unit 104 outputs the calculated coordinate values (X, Y) to the pixel interpolation processing unit 105. Note that projective transformation by the coordinate conversion processing unit 104 will be described in detail later.

Based on the pixel values ($R_{(x, y)}$, $G_{(x, y)}$, $B_{(x, y)}$) of each pixel of the input image and the coordinate values (X, Y) of each pixel of the output image input by the coordinate conversion processing unit 104, the pixel interpolation processing unit 105 (a pixel value deriving unit) calculates and outputs the pixel values of each pixel of the output image. That is, the pixel values ($R_{(X, Y)}$, $G_{(X, Y)}$, $B_{(X, Y)}$) of the coordinate values (X, Y) of the output image are calculated based on a plurality of pixel values around a corresponding pixel of the input image. For example, for the pixel values of four pixels on the input image corresponding to the integer parts of the coordinate values (X, Y) of the output image, a weighted average is obtained using the fraction parts of the coordinate values (X, Y) of the output image, and undergoes bilinear interpolation, thereby calculating the pixel values to the output pixel (X, Y). Interpolation calculation other than bilinear interpolation may be used, as a matter of course.

Figure 4:
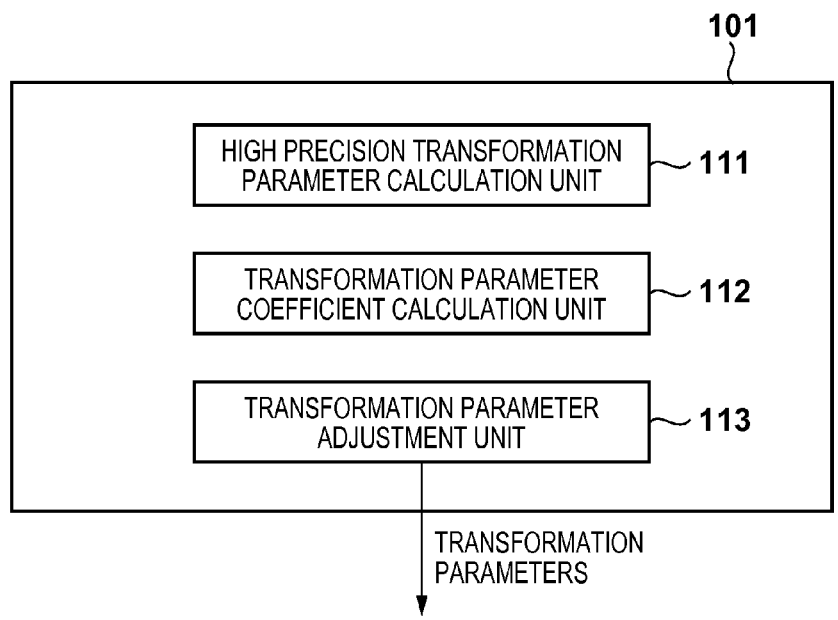
FIG. 4 is a block diagram showing the arrangement of a parameter calculation unit.

FIG. 4 is a block diagram showing the arrangement of the parameter calculation unit 101 according to the first embodiment. The parameter calculation unit 101 includes a high precision transformation parameter calculation unit 111, a transformation parameter coefficient calculation unit 112, and a transformation parameter adjustment unit 113.

The high precision transformation parameter calculation unit 111 calculates high precision transformation parameters (the elements of a projective transformation matrix) based on the coordinates of four vertices for deciding the shape of the input image and those of four vertices for deciding the shape of the output image. Note that the parameter calculation unit 101 is configured to process double precision fixed point number values, as described above. That is, high precision transformation parameters are calculated as double precision fixed point numbers.

The transformation parameter coefficient calculation unit 112 and transformation parameter adjustment unit 113 adjust the high precision transformation parameters calculated by the high precision transformation parameter calculation unit 111. More specifically, the units 112 and 113 adjust the high precision transformation parameters so as to decrease a calculation error in the coordinate conversion processing unit 104 of the image transformation processing unit 102. Note that the operation of the transformation parameter coefficient calculation unit 112 and transformation parameter adjustment unit 113 will be described in detail later.

<Error in Projective Transformation>

Projective transformation by the coordinate conversion processing unit 104 of the image transformation processing unit 102 will be described below. The transformation parameters for projective transformation are represented as nine values included in a 3×3 matrix. Let $m_{11}$ to $m_{33}$ be the transformation parameters as single precision fixed point numbers which are processed by the coordinate conversion processing unit 104. Then, the coordinate values (X, Y) of each pixel of the output image for the coordinate values (x, y) of each pixel of the input image are obtained by performing the following calculation.

The output coordinates (X, Y) after two-dimensional projective transformation (projective transformation of a plane figure) are derived by:

$$X = X_0/Z_0 \quad (1)$$

$$Y = Y_0/Z_0 \quad (2)$$

where $$X_0 = m_{11} \cdot x + m_{12} \cdot y + m_{13} \quad (3)$$

$$Y_0 = m_{21} \cdot x + m_{22} \cdot y + m_{23} \quad (4)$$

$$Z_0 = m_{31} \cdot x + m_{32} \cdot y + m_{33} \quad (5)$$

As indicated by equations (1) and (2), division is performed to derive X and Y. For either implementation by hardware or implementation by software, a calculation bit width is defined when performing calculation. If division calculation is included, implementation with a narrower bit width is desirable to decrease the number of circuits or the number of processing cycles.

As described above, in the first embodiment, the coordinate conversion processing unit 104 of the image transformation processing unit 102 calculates single precision fixed point numbers. On the other hand, the high precision transformation parameter calculation unit 111 of the parameter calculation unit 101 calculates double precision fixed point numbers, and derives high precision transformation parameters as double precision fixed point numbers. The high precision transformation parameters are rounded off to single precision fixed point numbers, and then used by the coordinate conversion processing unit 104. That is, restriction on the bit width causes rounding errors in the transformation parameters used by the coordinate conversion processing unit 104.

In this example, $m_{11}$ to $m_{33}$ are represented by components $m'_{11}$ to $m'_{33}$ without any errors and error components $e_{11}$ to $e_{33}$ as follows:

$$m_{11} = m'_{11} + e_{11}$$

. . . .

$$m_{33} = m'_{33} + e_{33}$$

That is, based on the relationship indicated by equation (5), $Z_0$ as a divisor (the value of the denominator) of equation (1) or (2) can be written as:

$$Z_0 = (m'_{31} + e_{31}) \cdot x + (m'_{32} + e_{32}) \cdot y + (m'_{33} + e_{33}) = m'_{31} \cdot x + m'_{32} \cdot y + m'_{33} + (e_{31} \cdot x + e_{32} \cdot y + e_{33}) \quad (6)$$

That is, it is found that an error ($e_{31} \cdot x + e_{32} \cdot y + e_{33}$) may occur in $Z_0$. Three transformation parameters (one or more initial parameters) used for the divisor in division processing are associated with the error. Consider the ranges of x and y. If, for example, the input image is an image having the HD resolution (1920×1080), x ranges from 0 to 1919 and y ranges from 0 to 1079. That is, the maximum value of x is nearly twice that of y.

It can be understood, therefore, that in the error term of equation (6), $e_{31}$ has a largest influence on the error among $e_{31}$ to $e_{33}$. That is, it can be found that it is most effective to approximate $e_{31}$ to 0 in order to decrease the error in $Z_0$.

In division, even if the dividend and divisor are respectively multiplied by the same coefficient, a division result does not change. If, for example, the dividend and divisor on the right-hand side of equation (1) or (2) are respectively multiplied by a scaling coefficient k, then $$\begin{aligned} X &= k \cdot X_0 / k \cdot Z_0 \\ &= k \cdot (m_{11} \cdot x + m_{12} \cdot y + m_{13})/k \cdot (m_{31} \cdot x + m_{32} \cdot y + m_{33}) \\ &= (k \cdot m_{11} \cdot x + k \cdot m_{12} \cdot y + k \cdot m_{13})/ \\ &\quad (k \cdot m_{31} \cdot x + k \cdot m_{32} \cdot y + k \cdot m_{33}) \end{aligned} \quad (1')$$

Similarly, $$\begin{aligned} Y &= k \cdot Y_0 / k \cdot Z_0 \\ &= k \cdot (m_{21} \cdot x + m_{22} \cdot y + m_{23})/k \cdot (m_{31} \cdot x + m_{32} \cdot y + m_{33}) \\ &= (k \cdot m_{21} \cdot x + k \cdot m_{22} \cdot y + k \cdot m_{23})/ \\ &\quad (k \cdot m_{31} \cdot x + k \cdot m_{32} \cdot y + k \cdot m_{33}) \end{aligned} \quad (2')$$

That is, it can be understood that it is possible to control a division error in the image transformation processing unit 102 by transferring, to the image transformation processing unit 102, $k \cdot m_{11}$ to $k \cdot m_{33}$ obtained by respectively multiplying $m_{11}$ to $m_{33}$ by the scaling coefficient k, instead of $m_{11}$ to $m_{33}$.

<Deriving of Scaling Coefficient k and Adjustment of Transformation Parameters>

In the first embodiment, the scaling coefficient k such that $e_{31}$ is nearly equal to 0 is obtained, and $k \cdot m_{11}$ to $k \cdot m_{33}$ obtained by respectively multiplying $m_{11}$ to $m_{33}$ by the scaling coefficient k are transferred to the image transformation processing unit 102. This suppresses an undesirable decrease in calculation precision without changing the image transformation processing unit 102 including the coordinate conversion processing unit 104.

Assume that high precision transformation parameters $d_{11}$ to $d_{33}$ calculated by the high precision transformation parameter calculation unit 111 (an initial parameter deriving unit) are double precision fixed point numbers (each having a fraction part of 8 bits). Assume also that the transformation parameters $m_{11}$ to $m_{33}$ to be output to the coordinate conversion processing unit 104 are single precision fixed point numbers (each having a fraction part of 4 bits).

The transformation parameter coefficient calculation unit 112 (a scaling coefficient deriving unit) performs a left shift for $d_{31}$ calculated by the high precision transformation parameter calculation unit 111 by the number of digits of the fraction part of $m_{31}$. That is, 4-bit left shift processing is executed for $d_{31}$. Note that a left shift is preferably performed for only the smallest one of values such that the fraction part of $d_{31}$ becomes 0 when undergoing multiplication. Processing of rounding off the first decimal place of the decimal number of the value having undergone the left shift is performed (for example, it is possible to round off the number by extracting only the integer part after adding 0.5). Let $d'_{31}$ be the thus obtained value. Then, the transformation parameter coefficient calculation unit 112 derives the scaling coefficient k given by:

$$k = (d'_{31}/d_{31}) \quad (7)$$

After that, the transformation parameter adjustment unit 113 multiplies, by the scaling coefficient k, each of the high precision transformation parameters $d_{11}$ to $d_{33}$ calculated by the high precision transformation parameter calculation unit 111. The unit 113 converts each of the double precision fixed point numbers $k \cdot d_{11}$ to $k \cdot d_{33}$ into a single precision fixed point number, thereby deriving the transformation parameters $m_{11}$ to $m_{33}$. That is, $m_{31}$ is derived by converting $k \cdot d_{31}$ into a single precision fixed point number, as given by:

$$k \cdot d_{31} = (d'_{31}/d_{31}) \cdot d_{31} = d'_{31}$$

This means that $m_{31}$ is obtained by converting $d'_{31}$ into a single precision fixed point number. As described above, $d'_{31}$ is obtained by performing a 4-bit left shift for $d_{31}$, and rounding off the resultant value to an integer. Therefore, no rounding error occurs in converting $d'_{31}$ into $m_{31}$, and "$e_{31} \cdot x$" of the error term of equation (6) becomes 0.

In the above description, $d'_{31}$ is calculated by performing a left shift for $d_{31}$ by the number of digits of the fraction part of $m_{31}$. If, however, lower bits of $d_{31}$, the number of which is smaller than a predetermined number, are all zeros, $d'_{31}$ may be calculated by performing a left shift for $d_{31}$ by a smaller number of digits.

<Operation of Apparatus>

Figure 5:
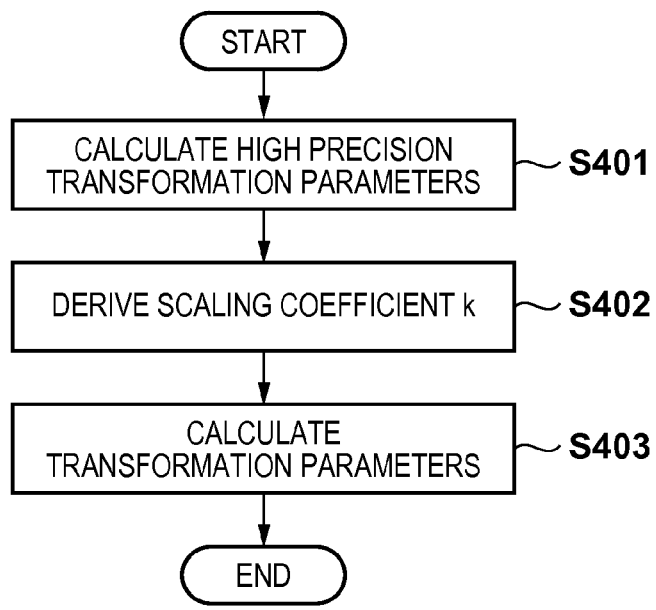
FIG. 5 is a flowchart illustrating transformation parameter calculation.

FIG. 5 is a flowchart illustrating transformation parameter calculation according to the first embodiment. The following processing is executed when, for example, starting to use or setting up the liquid crystal projector including the image processing apparatus 100.

In step S401, for example, the high precision transformation parameter calculation unit 111 calculates high precision transformation parameters based on the coordinates of four vertices for determining the shape of an input image and those of four vertices for determining the shape of an output image. The unit 111 outputs the calculated high precision transformation parameters to the transformation parameter coefficient calculation unit 112. As described above, assume that the high precision transformation parameters $d_{11}$ to $d_{33}$ are double precision fixed point numbers.

In step S402, the transformation parameter coefficient calculation unit 112 derives the scaling coefficient k for the high precision transformation parameters $d_{11}$ to $d_{33}$, and outputs it to the transformation parameter adjustment unit 113. As described above, a high precision transformation parameter element which has the largest influence on a calculation error in coordinate conversion processing is selected, and the scaling coefficient k such that the rounding error of the selected high precision transformation parameter element becomes 0 when executing rounding processing is calculated.

In step S403, the transformation parameter adjustment unit 113 multiplies each of the high precision transformation parameters $d_{11}$ to $d_{33}$ by the scaling coefficient k, and converting the resultant values into single precision fixed point numbers, thereby deriving the transformation parameters $m_{11}$ to $m_{33}$. The thus derived transformation parameters $m_{11}$ to $m_{33}$ are output to the coordinate conversion processing unit 104 of the image transformation processing unit 102.

Figure 6:
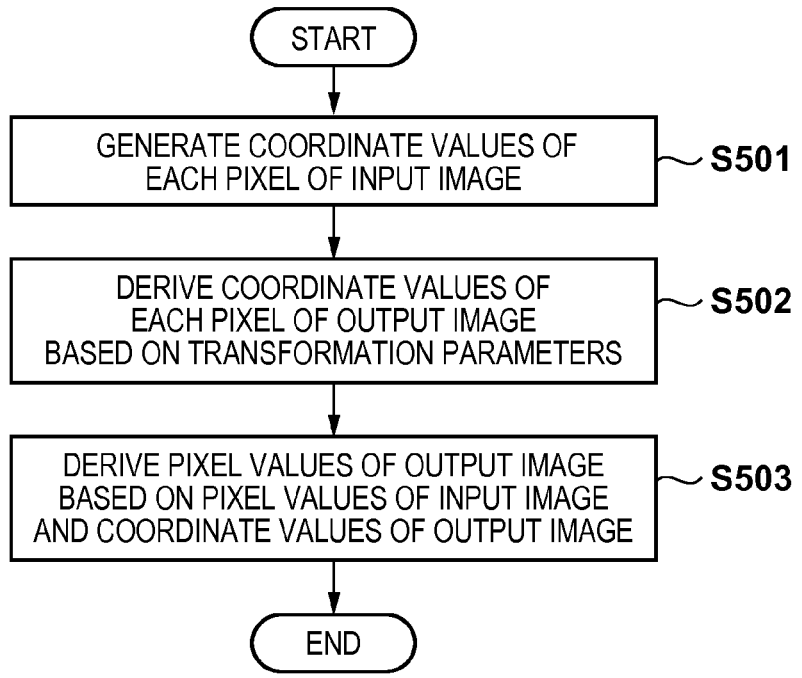
FIG. 6 is a flowchart illustrating output image generation.

FIG. 6 is a flowchart illustrating keystone transform processing. The following processing is executed by, for example, setting each frame image of a moving image as an input image, thereby obtaining an output image (keystone correction image) for each frame image.

In step S501, the pixel coordinate generation unit 103 generates coordinate values (x, y) corresponding to each pixel of the input image, and outputs them to the coordinate conversion processing unit 104.

In step S502, based on the transformation parameters input by the parameter calculation unit 101, the coordinate conversion processing unit 104 derives the coordinate values (X, Y) of each pixel of the output image corresponding to the coordinate values (x, y) of each pixel of the input image. That is, as described above, projective transformation calculation is performed for the coordinate values of each pixel of the input image, thereby deriving the coordinate values of each pixel of the output image.

In step S503, the pixel interpolation processing unit 105 calculates and outputs the pixel values of each pixel of the output image based on the pixel values of each pixel of the input image and the coordinate values (X, Y) of each pixel of the output image input by the coordinate conversion processing unit 104. For example, as described above, the pixel values of the coordinate values (X, Y) of the output image are calculated based on bilinear interpolation of a plurality of pixel values around a corresponding pixel of the input image.

As described above, according to the first embodiment, it is possible to decrease a rounding error which may occur in projective transformation calculation by the coordinate conversion processing unit 104, and suppress the occurrence of deterioration in image quality of the output image. More specifically, it is possible to efficiently decrease a rounding error by focusing on a term ($m_{31} \cdot x$ of equation (5)) which has the largest influence on a calculation error in division processing. Note that although projective transformation calculation associated with keystone correction has been explained by way of an example in the first embodiment, the present invention is applicable to various processes including division calculation.

Since only transformation parameters used by the image transformation processing unit 102 are substantially changed (adjusted), it is possible to improve the calculation precision while using the implementation of the image transformation processing unit 102. That is, it is not necessary to change the image transformation processing unit 102, and it is possible to improve the image quality of the output image by making only a minimal change to the implementation of the parameter calculation unit 101.

Furthermore, although the arrangement in which the pixel coordinate values of the output image corresponding to those of the input image are calculated has been explained in the first embodiment, the pixel coordinate values of the input image corresponding to those of the output image may be calculated. In this case, it is only necessary to adjust transformation parameters represented as the inverse transformation matrix of projective transformation.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-129160, filed Jun. 6, 2012, which is hereby incorporated by reference herein in its entirety.

What is claimed is:

1. An image processing apparatus for executing image transformation processing for an input image, comprising:
   a parameter calculation unit configured to calculate a plurality of transformation parameters, each represented by a fixed point number having an n-bit length; and
   a calculation unit configured to perform a calculation for coordinate conversion processing in the image transformation processing using the plurality of transformation parameters calculated by said parameter calculation unit,
   said parameter calculation unit comprising
      an initial parameter deriving unit configured to derive a plurality of initial parameters, each represented by a fixed point number having an m-bit length, where m>n,
      a scaling coefficient deriving unit configured to derive a scaling coefficient such that a rounding error becomes smallest when converting an initial parameter, among the plurality of initial parameters, which has the largest influence on a calculation error in the coordinate conversion processing, into a fixed point number having an n-bit length, and
      an adjustment unit configured to calculate, as the plurality of transformation parameters, a plurality of parameters obtained by multiplying each of the plurality of initial parameters by the scaling coefficient derived by said scaling coefficient deriving unit, and converting the obtained values into fixed point numbers each having an n-bit length,
   wherein the initial parameter which has the largest influence on the calculation error in the coordinate conversion processing is selected from at least one initial parameter, among the plurality of initial parameters, used for a divisor in division processing included in the coordinate conversion processing.

2. The apparatus according to claim 1, wherein said scaling coefficient deriving unit derives, as the scaling coefficient, a smallest value of values such that a fraction part of the initial parameter having a largest influence on the calculation error in the coordinate conversion processing becomes 0 when undergoing multiplication.

3. The apparatus according to claim 1, wherein said calculation unit further includes a pixel value deriving unit configured to derive, based on a result of the coordinate conversion processing and a pixel value of each pixel of the input image, a pixel value of each pixel of an image having undergone the image transformation processing.

4. The apparatus according to claim 3, wherein said pixel value deriving unit determines, based on an integer part of a coordinate value obtained by the coordinate transformation processing, at least one input pixel to be used to derive the pixel values of the image having undergone the image transformation processing, and decides, based on a fraction part of the coordinate value obtained by the coordinate transformation processing, the weight of said at least one input pixel to decide the pixel values of the image having undergone image transformation processing.

5. An image processing method of executing image transformation processing for an input image, comprising:
   a parameter calculation step of calculating a plurality of transformation parameters each represented by a fixed point number having an n-bit length; and
   a calculation step of performing a calculation for coordinate conversion processing in the image transformation processing using the plurality of transformation parameters calculated in the parameter calculation step,
   the parameter calculation step comprising
      an initial parameter deriving step of deriving a plurality of initial parameters each represented by a fixed point number having an m-bit length, where m>n,
      a scaling coefficient deriving step of deriving a scaling coefficient such that a rounding error becomes smallest when converting an initial parameter, among the plurality of initial parameters, which has the largest influence on a calculation error in the coordinate conversion processing, into a fixed point number having an n-bit length, and
      an adjustment step of calculating, as the plurality of transformation parameters, a plurality of parameters obtained by multiplying each of the plurality of initial parameters by the scaling coefficient derived in the scaling coefficient deriving step, and converting the obtained values into fixed point numbers each having an n-bit length,
   wherein the initial parameter which has the largest influence on the calculation error in the coordinate conversion processing is selected from at least one initial parameter, among the plurality of initial parameters, used for a divisor in division processing included in the coordinate conversion processing.

6. A non-transitory computer readable storage medium storing a program for causing a computer to function as an image processing apparatus for executing image transformation processing for an input image, comprising:
   a parameter calculation unit configured to calculate a plurality of transformation parameters each represented by a fixed point number having an n-bit length; and
   a calculation unit configured to perform a calculation for coordinate conversion processing in the image transformation processing using the plurality of transformation parameters calculated by said parameter calculation unit,
   said parameter calculation unit comprising:
      an initial parameter deriving unit configured to derive a plurality of initial parameters each represented by a fixed point number having an m-bit length, where m>n,
      a scaling coefficient deriving unit configured to derive a scaling coefficient such that a rounding error becomes smallest when converting an initial parameter, among the plurality of initial parameters, which has the largest influence on a calculation error in the coordinate conversion processing, into a fixed point number having an n-bit length, and
      an adjustment unit configured to calculate, as the plurality of transformation parameters, a plurality of parameters multiplying each of the plurality of initial parameters by the scaling coefficient derived by said scaling coefficient deriving unit, and converting the obtained values into fixed point numbers each having an n-bit length,
   wherein the initial parameter which has the largest influence on the calculation error in the coordinate conversion processing is selected from at least one initial parameter, among the plurality of initial parameters, used for a divisor in division processing included in the coordinate conversion processing.

7. An image processing apparatus comprising:
a calculation unit configured to calculate a plurality of transformation parameters, for coordinate conversion processing executed for generating a transformed image from an input image, and having an m-bit length;
a selection unit configured to select a transformation parameter, from the plurality of transformation parameters, corresponding to the biggest calculation error in the coordinate conversion processing;
a determination unit configured to determine an adjustment coefficient so that a rounding error that occurs by converting the selected transformation parameter from an m-bit length into an n-bit length, where m>n, using the adjustment coefficient, is less than a rounding error that occurs by converting an unselected transformation parameter from an m-bit length into an n-bit length using the adjustment coefficient;
an adjustment unit configured to adjust the plurality of transformation parameters based on the determined adjustment coefficient;
a conversion unit configured to convert the plurality of adjusted transformation parameters of an m-bit length into an n-bit length; and
a generation unit configured to generate the transformed image from the input image based on the converted transformation parameters.

8. The apparatus according to claim 7, wherein the calculation unit calculates the plurality of transformation parameters including a first transformation parameter related to an X-direction and a second transformation parameter related to a Y-direction, and
the selection unit selects the transformation parameter based on the size of the input image in the X-direction and the size of input image in the Y-direction.

9. The apparatus according to claim 7, wherein the adjustment unit multiplies the plurality of transformation parameters by the adjustment coefficient to obtain the adjusted transformation parameters.

10. An image processing method comprising:
calculating a plurality of transformation parameters, for coordinate conversion processing executed for generating a transformed image from an input image, and having an m-bit length;
selecting a transformation parameter, from the plurality of transformation parameters, corresponding to a bigger calculation error in the coordinate conversion processing;
determining an adjustment coefficient so that a rounding error that occurs by converting the selected transformation parameter from an m-bit length into an n-bit length, where m>n, using the adjustment coefficient, is less than a rounding error that occurs by converting an unselected transformation parameter from an m-bit length into an n-bit length using the adjustment coefficient;
adjusting the plurality of transformation parameters based on the determined adjustment coefficient;
converting the plurality of adjusted transformation parameters of an m-bit length into an n-bit length; and
generating the transformed image from the input image based on the converted transformation parameters.

11. The method according to claim 10, wherein the plurality of transformation parameters including a first transformation parameter related to an X-direction and a second transformation parameter related to a Y-direction are calculated in the calculating step, and
the transformation parameter is selected in the selecting step based on the size of the input image in the X-direction and the size of the input image in the Y-direction.

12. The method according to claim 10, wherein the plurality of transformation parameters are multiplied by the adjustment coefficient in the adjusting step to obtain the adjusted transformation parameters.

* * * * *